(12) United States Patent
Hashitani et al.

(10) Patent No.: US 12,087,937 B2
(45) Date of Patent: Sep. 10, 2024

(54) NON-AQUEOUS ELECTROLYTE SECONDARY BATTERY

(71) Applicant: SANYO Electric Co., Ltd., Daito (JP)

(72) Inventors: Sanae Hashitani, Osaka (JP);
Mitsunori Miyanari, Osaka (JP);
Masashi Takigawa, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 691 days.

(21) Appl. No.: 16/959,739

(22) PCT Filed: Jan. 11, 2019

(86) PCT No.: PCT/JP2019/000739
§ 371 (c)(1),
(2) Date: Jul. 2, 2020

(87) PCT Pub. No.: WO2019/142744
PCT Pub. Date: Jul. 25, 2019

(65) Prior Publication Data
US 2021/0013489 A1  Jan. 14, 2021

(30) Foreign Application Priority Data

Jan. 19, 2018 (JP) ................. 2018-006828

(51) Int. Cl.
*H01M 4/36* (2006.01)
*H01M 4/48* (2010.01)
(Continued)

(52) U.S. Cl.
CPC ........... *H01M 4/364* (2013.01); *H01M 4/483* (2013.01); *H01M 4/485* (2013.01); *H01M 4/525* (2013.01);
(Continued)

(58) Field of Classification Search
CPC ...... H01M 4/364; H01M 4/483; H01M 4/485; H01M 4/525; H01M 4/587;
(Continued)

(56) References Cited

U.S. PATENT DOCUMENTS

2015/0188127 A1 7/2015 Niimi et al.
2017/0214041 A1 7/2017 Minami et al.
(Continued)

FOREIGN PATENT DOCUMENTS

CN 107112521 A 8/2017
JP 2007-59213 A 3/2007
(Continued)

OTHER PUBLICATIONS

Machine translation of JP 2013-161705, retrieved from <www.espacenet.com> on Apr. 12, 2024. (Year: 2024).*
(Continued)

*Primary Examiner* — Cynthia K Walls
(74) *Attorney, Agent, or Firm* — WHDA, LLP

(57) ABSTRACT

A non-aqueous electrolyte secondary battery according to one aspect of the present invention includes: a positive electrode plate in which a positive electrode mixture layer containing a positive electrode active material is formed on a positive electrode current collector; a negative electrode plate in which a negative electrode mixture layer containing a negative electrode active material is formed on a negative electrode current collector; a separator; a non-aqueous electrolyte; a sealing member; and an outer casing. The negative electrode active material contains graphite and a silicon material. The silicon material contains silicon oxide represented by $SiO_x$ ($0.5 \leq x < 1.6$) and a silicon-lithium silicate composite in which a silicon phase is dispersed in a lithium silicate phase represented by $Li_{2z}SiO_{(2+z)}$ ($0 < z < 2$). The amount of the silicon-lithium silicate composite is 33% by (Continued)

mass or more and 93% by mass or less relative to the silicon material.

4 Claims, 1 Drawing Sheet

(51) Int. Cl.
  *H01M 4/485* (2010.01)
  *H01M 4/525* (2010.01)
  *H01M 4/587* (2010.01)
  *H01M 10/0525* (2010.01)

(52) U.S. Cl.
  CPC ....... *H01M 4/587* (2013.01); *H01M 10/0525* (2013.01)

(58) Field of Classification Search
  CPC ....... H01M 10/0525; H01M 2004/027; H01M 2004/028; H01M 4/386; H01M 4/5825; Y02E 60/10
  See application file for complete search history.

(56) References Cited

U.S. PATENT DOCUMENTS

| | | | |
|---|---|---|---|
| 2017/0331102 A1 | | 11/2017 | Akira et al. |
| 2018/0026298 A1* | | 1/2018 | Hasegawa ............ H01M 4/483 429/322 |
| 2018/0040881 A1 | | 2/2018 | Kusagawa et al. |

FOREIGN PATENT DOCUMENTS

| | | | | |
|---|---|---|---|---|
| JP | 2010-212228 A | | 9/2010 | |
| JP | 2013-161705 | * | 8/2013 | ............. H01M 4/38 |
| JP | 2017-199657 A | | 11/2017 | |
| WO | 2016/035290 A1 | | 3/2016 | |
| WO | 2016/141032 A1 | | 9/2016 | |
| WO | 2016/147564 A1 | | 9/2016 | |
| WO | WO 2016/136227 | * | 9/2016 | ........ H01M 10/0525 |
| WO | 2020/066576 A1 | | 4/2020 | |

OTHER PUBLICATIONS

International Search Report dated Mar. 19, 2019, issued in counterpart application No. PCT/JP2019/000739 (1 page).
The Extended European Search Report dated Feb. 3, 2021, issued in counterpart EP Application No. 19741871.8. (6 pages).
English Translation of Chinese Office Action dated Sep. 30, 2022 for the related Chinese Patent Application No. 201980007559.8.

* cited by examiner

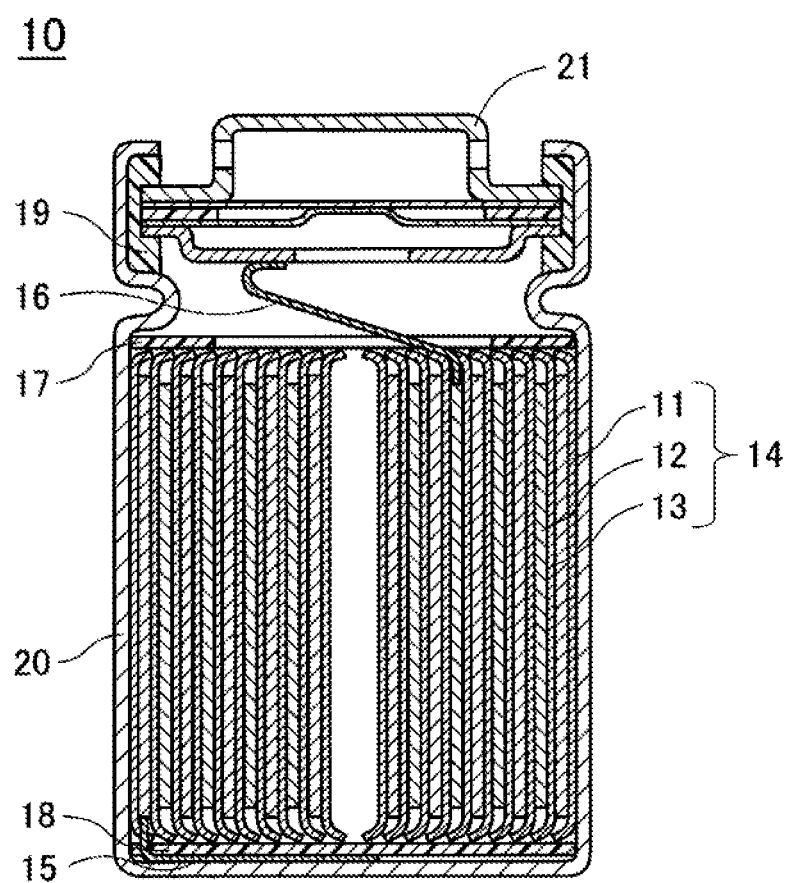

NON-AQUEOUS ELECTROLYTE SECONDARY BATTERY

TECHNICAL FIELD

The present invention relates to a non-aqueous electrolyte secondary battery including graphite, silicon oxide, and a silicon-lithium silicate composite as negative electrode active materials.

BACKGROUND ART

In recent years, electric vehicles have been expected to spread rapidly in the future, and non-aqueous electrolyte secondary batteries used as power sources of electric vehicles have attracted attention. The spread of electric vehicles is promoted by, for example, extending the driving range and shortening the charging time. Since the driving range and charging time of electric vehicles depend on the performance of non-aqueous electrolyte secondary batteries, there is a need to increase the capacity of non-aqueous electrolyte secondary batteries and improve the rapid charge characteristics.

Many carbon materials, such as graphite, are used as negative electrode active materials of non-aqueous electrolyte secondary batteries. Carbon materials can suppress the growth of lithium dendrites during charging while having a discharge potential similar to that of lithium metal. The use of a carbon material as a negative electrode active material can provide non-aqueous electrolyte secondary batteries with high safety. For example, graphite can intercalate lithium ions until a composition of $LiC_6$ is obtained, and graphite has a theoretical capacity of 372 mAh/g.

However, carbon materials currently used already exhibit a capacity close to the theoretical capacity, and it is difficult to increase the capacity of a non-aqueous electrolyte secondary battery by improving a negative electrode active material. In recent years, silicon materials, such as silicon and silicon oxide, which have higher capacity than carbon materials, have attracted attention as negative electrode active materials for non-aqueous electrolyte secondary batteries. For example, silicon can intercalate lithium ions until a composition of $Li_{4.4}Si$ is obtained, and silicon has a theoretical capacity of 4200 mAh/g. The use of silicon materials as negative electrode active materials can provide non-aqueous electrolyte secondary batteries with high capacity.

Like carbon materials, silicon materials can suppress the growth of lithium dendrites during charging. However, the amounts of expansion and contraction associated with charging and discharging for silicon materials are larger than those for carbon materials. Silicon materials thus have poorer cycle characteristics than carbon materials due to finer particles of negative electrode active materials and detachment from the electrical conduction network.

PTL 1 discloses a non-aqueous electrolyte secondary battery including graphite and silicon oxide represented by $SiO_x$ ($0.5 \leq x \leq 1.5$) as negative electrode active materials. The degradation in battery characteristics due to changes in $SiO_x$ volume associated with charging and discharging is suppressed by setting the silicon oxide content to 3% to 20% by mass relative to the total mass of graphite and silicon oxide.

PTL 2 discloses a negative electrode active material for non-aqueous electrolyte secondary batteries. The negative electrode active material includes silicon particles dispersed in the lithium silicate phase. The technique disclosed in PTL 2 solves the problem of decreases in initial charge-discharge efficiency caused by the irreversible reaction in which silicon oxide represented by $SiO_x$ is converted to $Li_4SiO_4$ during charging and discharging.

CITATION LIST

Patent Literature

PTL 1: Japanese Published Unexamined Patent Application No. 2010-212228
PTL 2: WO 2016/035290

SUMMARY OF INVENTION

Technical Problem

The negative electrode active material disclosed in PTL 1 can contribute to high capacity of non-aqueous electrolyte secondary batteries. However, with the recent demand for non-aqueous electrolyte secondary batteries with higher capacity, battery materials, such as negative electrode active materials and positive electrode active materials, are densely packed inside batteries. Such a battery thus tends to have a small space occupied by an electrolyte. There is therefore a need to achieve satisfactory battery characteristics even with a small amount of electrolyte. Since the mass production of non-aqueous electrolyte secondary batteries causes a certain degree of variation in electrolyte injection amount, the tolerance on the electrolyte injection amount is preferably large. The inventors of the present invention have conducted studies and, as a result, have found that, when silicon oxide represented by $SiO_x$ is used as a negative electrode active material, the capacity of batteries decreases with the lapse of storage days before shipping. This tendency becomes more marked as the electrolyte injection amount decreases, and the variations in electrolyte injection amount in the battery manufacturing process cause variations in battery capacity. To achieve high capacity by densely packing battery materials, there is a need to prevent degradation in storage characteristics caused by decreases in electrolyte injection amount.

The negative electrode active material disclosed in PTL 2 exhibits a high initial efficiency and thus can contribute to higher capacity compared with $SiO_x$. However, there is room for improvement in the rapid charge characteristics of the negative electrode active material disclosed in PTL 2.

In light of the above circumstances, the present invention is directed to a high-capacity non-aqueous electrolyte secondary battery having good storage characteristics and good rapid charge characteristics.

Solution to Problem

To solve the above problems, a non-aqueous electrolyte secondary battery according to one aspect of the present invention includes: a positive electrode plate in which a positive electrode mixture layer containing a positive electrode active material is formed on a positive electrode current collector; a negative electrode plate in which a negative electrode mixture layer containing a negative electrode active material is formed on a negative electrode current collector; a separator; a non-aqueous electrolyte; a sealing member; and an outer casing. The negative electrode active material contains graphite and a silicon material. The silicon material contains silicon oxide represented by $SiO_x$ ($0.5 \leq x < 1.6$) and a silicon-lithium silicate composite in which a silicon phase is dispersed in a lithium silicate phase represented by $Li_{2z}SiO_{(2+z)}$ ($0<z<2$). The amount of the silicon-lithium silicate composite is 33% by mass or more and 93% by mass or less relative to the silicon material.

Advantageous Effects of Invention

According to one aspect of the present invention, a high-capacity non-aqueous electrolyte secondary battery having good storage characteristics and good rapid charge characteristics can be provided.

BRIEF DESCRIPTION OF DRAWING

FIG. 1 is a cross-sectional view of a cylindrical non-aqueous electrolyte secondary battery according to an experimental example.

DESCRIPTION OF EMBODIMENTS

An embodiment of the present invention will be described with reference to various experimental examples including the embodiment of the present invention. It is noted that the present invention is not limited to the following experimental examples and can be appropriately modified and carried out without departing from the spirit of the present invention.

Experimental Example 1

(Production of Silicon Oxide)
Silicon oxide having a composition of SiO was heated in an argon atmosphere containing a hydrocarbon gas, and the surface of SiO was coated with carbon by chemical vapor deposition that causes the thermal decomposition of the hydrocarbon gas. The carbon coating amount was 10% by mass relative to the mass of SiO. Next, the SiO particles coated with carbon were subjected to disproportionation at 1000° C. in an argon atmosphere to form a fine Si phase and a $SiO_2$ phase in the SiO particles. The SiO particles were classified into a predetermined particle size to prepare SiO used as a negative electrode active material.

(Production of Silicon-Lithium Silicate Composite)
In an inert gas atmosphere, a silicon (Si) powder and a lithium silicate ($Li_2SiO_3$) powder were mixed at a mass ratio of 42:58, and the resulting mixture was milled in a planetary ball mill. The milled powder was then taken out and heated in an inert gas atmosphere at 600° C. for 4 hours. The heated powder (hereinafter referred to as base particles) was pulverized and mixed with coal-tar pitch. The resulting mixture was heated in an inert gas atmosphere at 800° C. for 5 hours to form a carbon-containing electrically conductive layer on the surface of the base particles. The carbon content of the electrically conductive layer was 5% by mass relative to the total mass of the base particles and the electrically conductive layer. Finally, the base particles having the electrically conductive layer were classified to provide a silicon-lithium silicate composite having an average particle size of 5 μm. In the base particles, the silicon phase was dispersed in the lithium silicate phase.

(Production of Negative Electrode Plate)
In addition to SiO and the silicon-lithium silicate composite produced as described above, graphite was used as a negative electrode active material. A negative electrode active material was prepared by mixing 3 parts by mass of SiO, 1.5 parts by mass of the silicon-lithium silicate composite, and 95.5 parts by mass of graphite. The negative electrode active material (100 parts by mass) was mixed with 1.5 parts by mass of carboxymethyl cellulose (CMC) serving as a thickener and 1 part by mass of styrene butadiene rubber (SBR) serving as a binder. The resulting mixture was added to water serving as a dispersion medium and kneaded to prepare a negative electrode mixture slurry. The negative electrode mixture slurry was applied, by doctor blade, to each surface of an 8-μm-thick negative electrode current collector made of copper, and dried to form negative electrode mixture layers. The negative electrode mixture layers after drying were compressed by using a compression roller, and the electrode plate after compression was cut into a predetermined size to produce a negative electrode plate 11.

(Production of Positive Electrode Plate)
A lithium-nickel composite oxide having a composition of $LiNi_{0.88}Co_{0.09}Al_{0.03}O_2$ was used as a positive electrode active material. The positive electrode active material (100 parts by mass) was mixed with 1.25 parts by mass of acetylene black serving as a conductive agent and 1.7 parts by mass of polyvinylidene fluoride (PVDF) serving as a binder. The resulting mixture was added to N-methylpyrrolidone (NMP) serving as a dispersion medium and kneaded to prepare a positive electrode mixture slurry. The positive electrode mixture slurry was applied, by doctor blade, to each surface of a 15-μm-thick positive electrode current collector made of aluminum, and dried to form positive electrode mixture layers. The positive electrode mixture layers after drying were compressed by using a compression roller, and the electrode plate after compression was cut into a predetermined size to produce a positive electrode plate 12.

(Preparation of Non-Aqueous Electrolyte)
A non-aqueous solvent was prepared by mixing ethylene carbonate (EC) and dimethyl carbonate (DMC) at a volume ratio of 1:3. A non-aqueous electrolyte was prepared by adding 5% by mass vinylene carbonate to the non-aqueous solvent and dissolving 1 mol/L lithium hexahexafluorophosphate ($LiPF_6$) in the resulting mixture.

(Production of Electrode Body)
A negative electrode lead 15 and a positive electrode lead 16 were respectively connected to the negative electrode plate 11 and the positive electrode plate 12, and the negative electrode plate 11 and the positive electrode plate 12 were wound with a polyethylene separator 13 therebetween to produce an electrode body 14.

(Production of Non-Aqueous Electrolyte Secondary Battery)
As illustrate in FIG. 1, an upper insulating plate 17 and a lower insulating plate 18 were respectively disposed on and below the electrode body 14 so that the electrode body 14 was accommodated in an outer can 20. The negative electrode lead 15 was connected to the bottom of the outer can 20, and the positive electrode lead 16 was connected to the internal terminal plate of a sealing member 21. Next, a non-aqueous electrolyte was injected into the outer can 20 under reduced pressure, and the sealing member 21 was crimped and fixed to the opening of the outer can 20 with a gasket 19 therebetween to produce a non-aqueous electrolyte secondary battery 10 according to experimental example 1. The injection amount of the non-aqueous electrolyte was 0.15 g smaller than the optimum amount in order to generate a clear difference in storage characteristics between experimental examples.

Experimental Example 2

A non-aqueous electrolyte secondary battery according to experimental example 2 was produced in the same manner as in experimental example 1 except that 3 parts by mass of SiO, 3 parts by mass of the silicon-lithium silicate composite, and 94 parts by mass of graphite were used.

Experimental Example 3

A non-aqueous electrolyte secondary battery according to experimental example 3 was produced in the same manner as in experimental example 1 except that 2.5 parts by mass of SiO, 4.5 parts by mass of the silicon-lithium silicate composite, and 93 parts by mass of graphite were used.

Experimental Example 4

A non-aqueous electrolyte secondary battery according to experimental example 4 was produced in the same manner as in experimental example 1 except that 2 parts by mass of SiO, 5.5 parts by mass of the silicon-lithium silicate composite, and 92.5 parts by mass of graphite were used.

Experimental Example 5

A non-aqueous electrolyte secondary battery according to experimental example 5 was produced in the same manner as in experimental example 1 except that 0.5 parts by mass of SiO, 6.5 parts by mass of the silicon-lithium silicate composite, and 93 parts by mass of graphite were used.

Experimental Example 6

A non-aqueous electrolyte secondary battery according to experimental example 6 was produced in the same manner as in experimental example 1 except that 0 parts by mass of SiO, 7 parts by mass of the silicon-lithium silicate composite, and 93 parts by mass of graphite were used.

Experimental Example 7

A non-aqueous electrolyte secondary battery according to experimental example 7 was produced in the same manner as in experimental example 1 except that 4.5 parts by mass of SiO, 1.5 parts by mass of the silicon-lithium silicate composite, and 94 parts by mass of graphite were used.

Experimental Example 8

A non-aqueous electrolyte secondary battery according to experimental example 8 was produced in the same manner as in experimental example 1 except that 7 parts by mass of SiO, 0 parts by mass of the silicon-lithium silicate composite, and 93 parts by mass of graphite were used.

Experimental Example 9

A non-aqueous electrolyte secondary battery according to experimental example 9 was produced in the same manner as in experimental example 1 except that only graphite was used as a negative electrode active material.

(Evaluation of Storage Characteristics)

In a 25° C. environment, the batteries according to experimental examples 1 to 9 were each charged at a constant current of 0.3 It until the battery voltage reached 4.2 V, and further charged at a constant voltage of 4.2 V until the current reached 0.02 It. Next, each battery was discharged at a constant current of 0.2 It until the battery voltage reached 2.5 V. The discharge capacity at this time was defined as the initial discharge capacity. After the initial discharge capacity was measured, each battery was charged at a constant current of 0.3 It up to 30% state of charge (SOC) and stored in a 25° C. environment for 30 days. After storage, each battery was charged and discharged in the same conditions as the conditions for measuring the initial discharge capacity, and the discharge capacity after storage was measured. The capacity deterioration rate (%), which is an indication of storage characteristics, was calculated in accordance with the following formula.

Capacity deterioration rate (%)=(initial discharge capacity−discharge capacity after storage)/initial discharge capacity×100

(Evaluation of Rapid Charge Characteristics)

The batteries according to experimental examples 1 to 9 were each charged in a 40° C. environment, and the length of time required to increase the state of charge (SOC) from 15% to 85% was measured. As charging conditions, a 7-step charging method including constant current charging (CC charging) and constant current-constant voltage charging (CC-CV charging) as shown in Table 1 is employed.

TABLE 1

| Step | Charging Method | Charging Current | Final Current | Final Voltage |
|------|-----------------|------------------|---------------|---------------|
| 1 | CC | ⅓ It | — | 3.48 V |
| 2 | CC-CV | 2 It | 1.5 It | 3.91 V |
| 3 | CC-CV | 1.5 It | 1.2 It | 4.02 V |
| 4 | CC-CV | 1.2 It | 0.8 It | 4.07 V |
| 5 | CC-CV | 0.8 It | 0.6 It | 4.135 V |
| 6 | CC-CV | 0.6 It | ⅓ It | 4.17 V |
| 7 | CC-CV | ⅓ It | 0.02 It | 4.2 V |

The evaluation results of the storage characteristics and the rapid charge characteristics are summarized in Table 2. The storage characteristics were indicated by a relative index where the capacity deterioration rate in experimental example 8 using only silicon oxide as a silicon material was 100. The rapid charge characteristics were indicated by a relative index where the charging time in experimental example 6 using only the silicon-lithium silicate composite as a silicon material was 100.

TABLE 2

| | Amount of Silicon Material *1 (% by mass) | Amount of Silicon-Lithium Silicate Composite *2 (% by mass) | Storage Characteristics (Capacity Deterioration Rate) | Rapid Charge Characteristics (Charging Time) |
|---|---|---|---|---|
| Example 1 | 4.5 | 33 | 61 | 96 |
| Example 2 | 6 | 50 | 61 | 96 |
| Example 3 | 7 | 64 | 56 | 96 |
| Example 4 | 7.5 | 73 | 50 | 96 |
| Example 5 | 7 | 93 | 50 | 97 |
| Example 6 | 7 | 100 | 50 | 100 |
| Example 7 | 6 | 25 | 83 | 96 |
| Example 8 | 7 | 0 | 100 | 96 |
| Example 9 | 0 | — | 56 | 93 |

*1 The amount of the silicon material is shown in percentage relative to the mass of the negative electrode active material.
*2 The amount of the silicon-lithium silicate composite is shown in percentage relative to the mass of the silicon material.

As shown in Table 2, experimental example 8 using only SiO as a silicon material exhibits a larger capacity deterioration rate associated with storage than experimental examples 1 to 7 including the silicon-lithium silicate composite as a silicon material. However, the use of the silicon-lithium silicate composite together with SiO as a silicon material improves the storage characteristics. As long as the amount of the silicon-lithium silicate composite is 33% by mass or more relative to the silicon material, the storage characteristics substantially equivalent to those of experimental example 9 using only graphite as a negative electrode active material are obtained. Therefore, the amount of the silicon-lithium silicate composite is preferably 33% by mass or more relative to the silicon material. The effect of improving the storage characteristics is markedly enhanced when the injection amount of the non-aqueous electrolyte is small. The variations in battery characteristics associated with variations in the injection amount of the non-aqueous electrolyte are thus suppressed according to the present disclosure.

In experimental example 6 using only the silicon-lithium silicate composite as a silicon material, the charging time to the fully charged state is long. However, the use of SiO together with the silicon-lithium silicate composite as a silicon material improves the rapid charge characteristics. As long as the amount of the silicon-lithium silicate composite is 93% by mass or less relative to the silicon material, the rapid charge characteristics are favorable. Therefore, the amount of the silicon-lithium silicate composite is preferably 93% by mass or less relative to the silicon material. Although not described in Table 2, the use of SiO together with the silicon-lithium silicate composite as a silicon material suppresses the polarization of the negative electrode during charging and thus provides good cycle characteristics.

In experimental examples, silicon oxide represented by SiO and the silicon-lithium silicate composite including silicon particles dispersed in the lithium silicate phase represented by $Li_2SiO_3$ were used as silicon materials. As silicon materials, silicon oxide represented by the formula of $SiO_x$ ($0.5 \leq x < 1.6$) and a silicon-lithium silicate in which a silicon phase is dispersed in a lithium silicate phase composite represented by the formula of $Li_{2z}SiO_{(2+z)}$ ($0<z<2$) can be used.

The amount of the silicon material in the negative electrode mixture layer is preferably, but not necessarily, 3% by mass or more and 20% by mass or less relative to the negative electrode active material in order to obtain a non-aqueous electrolyte secondary battery having high capacity and good battery characteristics. In experimental examples, a silicon material composed only of silicon oxide and the silicon-lithium silicate composite was used. However, the negative electrode active material may contain other silicon materials, such as silicon powder. In this case, the amount of the silicon-lithium silicate composite or silicon materials is calculated on the basis of the total mass of silicon oxide and the silicon-lithium silicate composite. The amount of other silicon materials is, for example, 5% by mass or less relative to the negative electrode active material.

It is not necessary to coat the surface of the silicon material with carbon as in experimental examples, but the surface of the silicon material is preferably coated with carbon in order to improve the electrical conductivity of the silicon material. The coating of at least part of the surface of the silicon material with carbon is sufficient, and the carbon coating amount is preferably 0.1% by mass or more and 10% by mass or less relative to the silicon material.

Examples of graphite used as a negative electrode active material include artificial graphite and natural graphite. These can be used alone or as a mixture. The surface of graphite can also be coated with carbon, and the carbon is preferably amorphous.

In addition to the lithium-nickel composite oxide described in experimental examples, a lithium-transition metal composite oxide that can intercalate and deintercalate lithium ions can be used as a positive electrode active material. Examples of the lithium-transition metal composite oxide include $LiMO_2$ (M is at least one of Co, Ni, and Mn), $LiMn_2O_4$, and $LiFePO_4$. The lithium-transition metal composite oxide can be used alone or as a mixture of two or more. The lithium-transition metal composite oxide can be used after adding at least one selected from the group consisting of Al, Ti, Mg, and Zr or after partially substituting the transition metal element with at least one selected from the group consisting of Al, Ti, Mg, and Zr.

Among the exemplary lithium-transition metal composite oxides, a lithium-nickel composite oxide containing Ni as a transition metal and as a main component is preferred. The Ni content of the lithium-nickel composite oxide is preferably 60 mol % or more and more preferably 80 mol % or more. The lithium-nickel composite oxide preferably contains Co and Al in addition to Ni. Examples of other suitable lithium-transition metal composite oxides include lithium-nickel-cobalt-manganese composite oxide containing Co and Mn together with Ni. For example, $LiNi_{0.6}Co_{0.2}Mn_{0.2}O_2$ and $LiNi_{0.8}Co_{0.1}Mn_{0.1}O_2$ can be used as a lithium-nickel-cobalt-manganese composite oxide. Lithium-nickel-cobalt-manganese composite oxides containing Ni as a transition metal and as a main component, as in these specific examples, are included in lithium-nickel composite oxides.

A solution of a lithium salt, which is an electrolyte salt, in a non-aqueous solvent can be used as a non-aqueous electrolyte. A non-aqueous electrolyte containing a gel polymer instead of a non-aqueous solvent or together with a non-aqueous solvent can also be used.

Examples of the non-aqueous solvent include cyclic carbonates, chain carbonates, cyclic carboxylates, and chain carboxylates. These non-aqueous solvents are preferably used as a mixture of two or more. Examples of cyclic carbonates include ethylene carbonate (EC), propylene carbonate (PC), and butylene carbonate (BC). Cyclic carbonates, such as fluoroethylene carbonate (FEC), in which hydrogen is partially substituted with fluorine can also be used. Examples of chain carbonates include dimethyl carbonate (DMC), ethyl methyl carbonate (EMC), diethyl carbonate (DEC), and methyl propyl carbonate (MPC). Examples of cyclic carboxylates include γ-butyrolactone (γ-BL) and γ-valerolactone (γ-VL). Examples of chain carboxylates include methyl pivalate, ethyl pivalate, methyl isobutyrate, and methyl propionate.

Examples of lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Among these lithium salts, $LiPF_6$ is particularly preferred, and the concentration of $LiPF_6$ in the non-aqueous electrolyte is preferably 0.5 to 2.0 mol/L. $LiPF_6$ can be mixed with another lithium salt, such as $LiBF_4$.

In addition to the cylindrical outer can described in experimental examples, a prismatic outer can or a laminated outer casing formed of a laminate sheet including a metal sheet and a resin sheet stacked thereon can be used as an outer casing.

INDUSTRIAL APPLICABILITY

According to the present invention, a high-capacity non-aqueous electrolyte secondary battery having good storage characteristics and good rapid charge characteristics can be provided. The present invention can thus be used in a wide range of industrial applications.

REFERENCE SIGNS LIST

10 Non-aqueous electrolyte secondary battery
11 Negative electrode plate
12 Positive electrode plate
13 Separator
14 Electrode body
15 Negative electrode lead
16 Positive electrode lead
17 Upper insulating plate
18 Lower insulating plate
19 Gasket
20 Outer can
21 Sealing member

The invention claimed is:

1. A non-aqueous electrolyte secondary battery comprising:
a positive electrode plate in which a positive electrode mixture layer containing a positive electrode active material is formed on a positive electrode current collector; a negative electrode plate in which a negative electrode mixture layer containing a negative electrode active material is formed on a negative electrode current collector; a separator; a non-aqueous electrolyte; a sealing member; and an outer casing,
wherein the negative electrode active material contains graphite and a silicon material,
the silicon material contains silicon oxide represented by $SiO_x$ ($0.5 \leq x < 1.6$) and a silicon-lithium silicate composite in which a silicon phase is dispersed in a lithium silicate phase represented by $Li_{2z}SiO_{(2+z)}$ ($0 < z < 2$),
an amount of the silicon-lithium silicate composite is 33% by mass or more and 73% by mass or less relative to the silicon material.

2. The non-aqueous electrolyte secondary battery according to claim 1, wherein an amount of the silicon material is 3% by mass or more and 20% by mass or less relative to the negative electrode active material.

3. The non-aqueous electrolyte secondary battery according to claim 1, wherein the positive electrode active material contains a lithium-nickel composite oxide.

4. The non-aqueous electrolyte secondary battery according to claim 2, wherein the positive electrode active material contains a lithium-nickel composite oxide.

* * * * *